(12) United States Patent
Rahman

(10) Patent No.: US 12,407,398 B2
(45) Date of Patent: Sep. 2, 2025

(54) COMPENSATING FOR POOR ANGULAR SPREAD OF MILLIMETER WAVES

(71) Applicant: T-MOBILE INNOVATIONS LLC, Overland Park, KS (US)

(72) Inventor: Muhammad Tawhidur Rahman, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 25 days.

(21) Appl. No.: 18/441,807

(22) Filed: Feb. 14, 2024

(65) Prior Publication Data

US 2025/0260471 A1   Aug. 14, 2025

(51) Int. Cl.
*H04B 7/06* (2006.01)
*H04B 17/318* (2015.01)
*H04B 17/336* (2015.01)

(52) U.S. Cl.
CPC ......... *H04B 7/0697* (2013.01); *H04B 17/328* (2023.05); *H04B 17/336* (2015.01)

(58) Field of Classification Search
CPC ... H04B 7/02; H04B 7/04; H04B 7/06; H04B 7/0697; H04B 7/0413; H04B 7/046; H04B 7/0469; H04B 7/10; H04B 7/155; H04B 7/15528; H04B 7/1555; H04B 10/50; H04B 10/516; H04B 10/532; H04B 14/00; H04B 14/002; H04B 14/008; H04B 17/30; H04B 17/309; H04B 17/366; H04B 17/328; H04B 17/345; H04B 17/318
See application file for complete search history.

(56) References Cited

U.S. PATENT DOCUMENTS

| | | | | |
|---|---|---|---|---|
| 8,488,703 B2* | 7/2013 | Wild | ............ | H04B 7/0689 375/267 |
| 9,356,669 B2* | 5/2016 | Gao | ............ | H04L 5/14 |
| 10,181,964 B2* | 1/2019 | Yum | ............ | H04B 17/345 |
| 10,277,337 B2* | 4/2019 | Bai | ............ | H04B 17/309 |
| 10,419,095 B2* | 9/2019 | Kang | ............ | H04B 7/0634 |
| 10,826,545 B1* | 11/2020 | Vazny | ............ | H04B 7/0837 |
| 10,879,627 B1* | 12/2020 | Frigon | ............ | H01Q 21/08 |
| 10,917,149 B2* | 2/2021 | Han | ............ | H04B 7/0456 |
| 11,374,627 B1* | 6/2022 | Kulkarni | ............ | H04B 7/0465 |
| 11,563,466 B2* | 1/2023 | Kulkarni | ............ | H04B 7/0413 |
| 11,683,737 B1* | 6/2023 | Kulkarni | ............ | H04W 36/28 370/331 |
| 11,777,559 B2* | 10/2023 | Kulkarni | ............ | H04B 7/0413 375/267 |
| 11,929,817 B1* | 3/2024 | Raghavan | ............ | H04B 7/0802 |
| 12,028,769 B2* | 7/2024 | Kulkarni | ............ | H04W 36/00692 |

(Continued)

*Primary Examiner* — James M Perez
(74) *Attorney, Agent, or Firm* — SHOOK, HARDY & BACON L.L.P.

(57) ABSTRACT

Embodiments of the present disclosure are directed to systems and methods for enhancing connections between user equipment (UE) and a base station. Particularly in order to mitigate the poor angular spread of higher frequency signaling, a second set of signals may be transmitted to a UE using a different polarization than a first set of signals. Depending on one or UE-specific parameters, the second set of signals may comprise a different data stream than a first set of signals to facilitate spatial multiplexing, or the second set of signals may comprise the same data stream as the first set of signals to facilitate spatial diversity.

20 Claims, 4 Drawing Sheets

(56) References Cited

U.S. PATENT DOCUMENTS

| | | | |
|---|---|---|---|
| 12,184,365 B2* | 12/2024 | Raghavan | H04B 17/336 |
| 12,250,607 B2* | 3/2025 | Kulkarni | H04W 36/00692 |
| 2012/0083317 A1* | 4/2012 | Athley | H04B 17/10 |
| | | | 455/562.1 |
| 2013/0064317 A1* | 3/2013 | Tong | H04B 7/0469 |
| | | | 375/267 |
| 2016/0365900 A1* | 12/2016 | Kim | H04B 7/0469 |
| 2017/0214443 A1* | 7/2017 | Chen | H04B 7/0469 |
| 2017/0352953 A1* | 12/2017 | Petersson | H04B 7/10 |
| 2018/0124761 A1* | 5/2018 | Athley | H04B 7/0617 |
| 2018/0176802 A1* | 6/2018 | Rosenhouse | H04B 14/008 |
| 2018/0183530 A1* | 6/2018 | Bai | H04B 17/12 |
| 2018/0288783 A1* | 10/2018 | Li | H04W 72/542 |
| 2018/0337739 A1* | 11/2018 | Petersson | H04B 17/27 |
| 2019/0020123 A1* | 1/2019 | Petersson | H01Q 25/001 |
| 2019/0074871 A1* | 3/2019 | Petersson | H01Q 3/40 |
| 2019/0097328 A1* | 3/2019 | Yong | H01Q 21/245 |
| 2019/0103906 A1* | 4/2019 | Athley | H04B 7/0695 |
| 2019/0103911 A1* | 4/2019 | Gharavi | H01Q 21/065 |
| 2019/0115791 A1* | 4/2019 | Zeine | H02J 50/23 |
| 2019/0334253 A1* | 10/2019 | Corman | H01Q 15/242 |
| 2019/0341993 A1* | 11/2019 | Karabinis | H04B 5/79 |
| 2019/0356057 A1* | 11/2019 | Carey | H01Q 1/241 |
| 2020/0186217 A1* | 6/2020 | Jidhage | H04B 7/0617 |
| 2020/0186241 A1* | 6/2020 | Tani | G01S 19/07 |
| 2021/0143871 A1* | 5/2021 | Ho | H04W 72/04 |
| 2021/0239783 A1* | 8/2021 | Calcev | G01S 5/0215 |
| 2022/0158717 A1* | 5/2022 | Frenger | H04B 7/0695 |
| 2022/0209832 A1* | 6/2022 | Raghavan | H04B 7/0452 |
| 2022/0416444 A1* | 12/2022 | Kronfeld | H04B 7/022 |
| 2023/0085759 A1* | 3/2023 | Horn | H04W 72/0446 |
| | | | 370/329 |
| 2023/0288517 A1* | 9/2023 | Walk | G01S 5/0218 |
| 2024/0072952 A1* | 2/2024 | Rom | H04L 5/0091 |
| 2024/0380448 A1* | 11/2024 | Raghavan | H04B 7/0456 |
| 2024/0405817 A1* | 12/2024 | Raghavan | H04B 7/0469 |
| 2025/0096878 A1* | 3/2025 | Bedewy | H04B 7/0691 |
| 2025/0141119 A1* | 5/2025 | Corman | H04B 7/10 |

\* cited by examiner

COMPENSATING FOR POOR ANGULAR SPREAD OF MILLIMETER WAVES

SUMMARY

The present disclosure is directed to improving the utilization of millimeter wave and higher frequency signaling in a wireless communication network, substantially as shown and/or described in connection with at least one of the Figures, and as set forth more completely in the claims.

According to various aspects of the technology, additional sets of signals are communicated to a UE using radio frequency (RF) waves in the extremely high frequency (EHF) range and higher (collectively referred to herein as "EHF+") based on a determination that the UE has a threshold low data rank or that there exists certain threshold channel or cell conditions. Because smaller antennas are most often to transmit signals having higher frequencies, the utilization of EHF+ results in a smaller angular spread than the utilization of traditional frequencies in the Very High Frequency (VHF) and Ultra High Frequency (UHF) ranges. Reduced angular spread means that fewer multi-paths are available to a UE, which is expected to reduce the ability of the UE to used advanced signal processing techniques such as spatial diversity and spatial multiplexing. By communicating additional sets of signals using different polarizations, the number of layers available to the UE will increase, allowing for an improved wireless communication between the UE and a base station.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
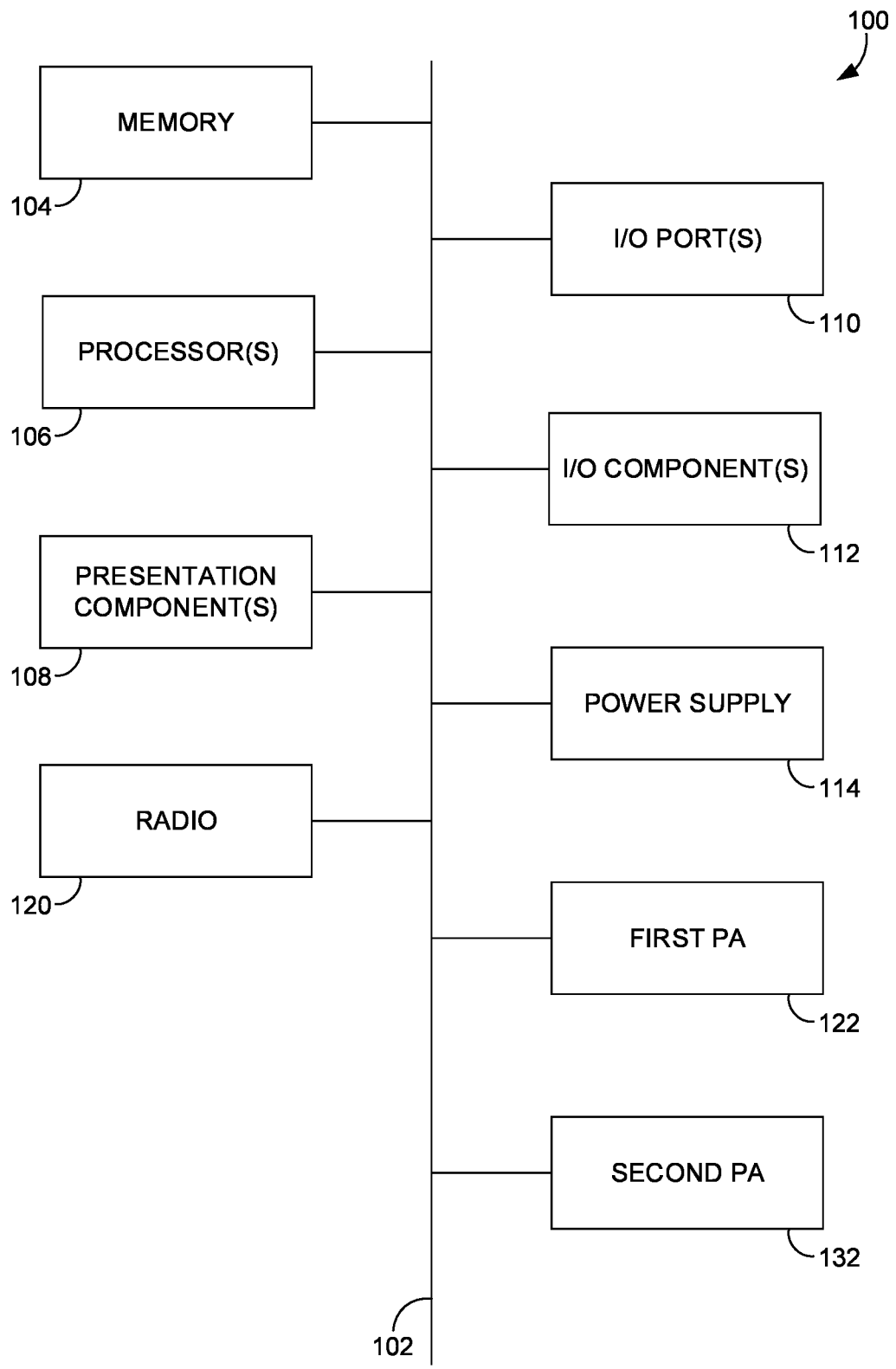
FIG. 1 illustrates a computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "mmWave" means RF waves having a wavelength measured in millimeters or fractions of millimeters (i.e., less than one cm), generally in the range of 30 GHz-3 THz, though frequencies above and below that range may still be used by aspects of the present disclosure.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, modern and future wireless telecommunication systems utilize ever higher frequencies in order to achieve ever greater transmission capacity. The use of higher frequencies, such as mm frequencies, has a few key consequences. First, signals with higher frequencies are more susceptible to fading, meaning they lose power more quickly. Whether because of free space path loss on direct a direct path between a base station and a UE or the loss due to reflection/refraction on indirect paths between the base station and the UE, an effective connection between the base station and the UE may exist under a smaller set of conditions—typically closer ranges and less obstructions. Second, higher frequency signals are often communicated with antennas that are physically smaller than lower frequencies; using smaller antennas results in less angular spread of signals than signals communicated from larger antennas. A key feature of wireless communication networks is the ability to use spatial diversity and/or spatial multiplexing to improve the connection between the base station and the UE, but less angular spread means fewer multi-paths; fewer multi-paths inherently limits the opportunities to perform spatial diversity of spatial multiplexing.

The use of mmWave connections in wireless communications is presently limited; however, conventional measures to address a poor connection between the base station and the UE involve handing over to cells with preferable connections. Modern UEs are configured to regularly perform measurements of available signals, so if the UE was connected using a mmWave frequency and the UE determined that a lower frequency signal would provide a better connection (e.g., due to the mmWave signals experiencing fading), the base station may instruct the UE to handover to a cell utilizing that lower frequency.

Unlike conventional solutions, the present disclosure is directed to utilizing additional sets of mmWave signals to improve the wireless connection between the base station and the UE based on a determination that one or more trigger conditions are met. If the UE is connected to the base station on a first mmWave connection, the first mmWave connection is utilizing signaling having a first polarization, and a trigger condition is met (e.g., a threshold low rank, a threshold poor connection, and/or a threshold high load at the cell), then the base station may communicate a second set of mmWave signals using a second polarization to the UE in order to create a second channel. Depending on the circumstances, the second channel can be used to improve the quality of the connection between the base station and the UE (e.g., by the use of spatial diversity), or to improve the capacity of the connection (e.g., by the use of spatial multiplexing.

Accordingly, a first aspect of the present disclosure is directed to a system for enhancing a wireless connection between a base station and a user equipment (UE). The system comprises a plurality of antenna elements configured to transmit one or more downlink signals from the base station to the UE, the plurality of antenna elements comprising a first set of antenna elements and a second set of antenna elements. The system further comprises one or more computer processing components configured to determine that one or more UE-specific parameters of a first connection between the base station and the UE satisfies one or more UE-specific thresholds, the first connection comprising a first set of signals transmitted from the first set of antenna elements and having a first polarization. The one or more computer processing components are further configured to that one or more radio environment parameters of a coverage area comprising the UE satisfies one or more radio environment thresholds. The one or more computer processing components are further configured to, based on said determinations, transmit a second set of signals to the UE using the second set of antenna elements, wherein the second set of signals has a second polarization, the first polarization being different than the second polarization.

A second aspect of the present disclosure is directed to a method for enhancing a wireless connection between a base station and a user equipment (UE). The method comprises determining that one or more UE-specific parameters of a first connection between a base station and the UE satisfies one or more UE-specific thresholds, the first connection comprising a first set of signals transmitted from a first set of antenna elements and having a first polarization. The method further comprises determining that one or more radio environment parameters of a coverage area comprising the UE satisfies one or more radio environment thresholds. The method further comprises, based on said determinations, transmitting a second set of signals from the base station to the UE using a second set of antenna elements, wherein the second set of signals has a second polarization, the first polarization being different than the second polarization.

Another aspect of the present disclosure is directed to a non-transitory computer readable media having instructions stored thereon that, when executed by one or more computer processing components, cause the one or more computer processing components to perform a method for enhancing a wireless connection between a base station and a user equipment (UE). The method comprises determining that one or more UE-specific parameters of a first connection between a base station and the UE satisfies one or more UE-specific thresholds, the first connection comprising a first set of signals transmitted from a first set of antenna elements and having a first polarization. The method further comprises determining that one or more radio environment parameters of a coverage area comprising the UE satisfies one or more radio environment thresholds. The method further comprises, based on said determinations, transmitting a second set of signals from the base station to the UE using a second set of antenna elements, wherein the second set of signals has a second polarization, the first polarization being different than the second polarization.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
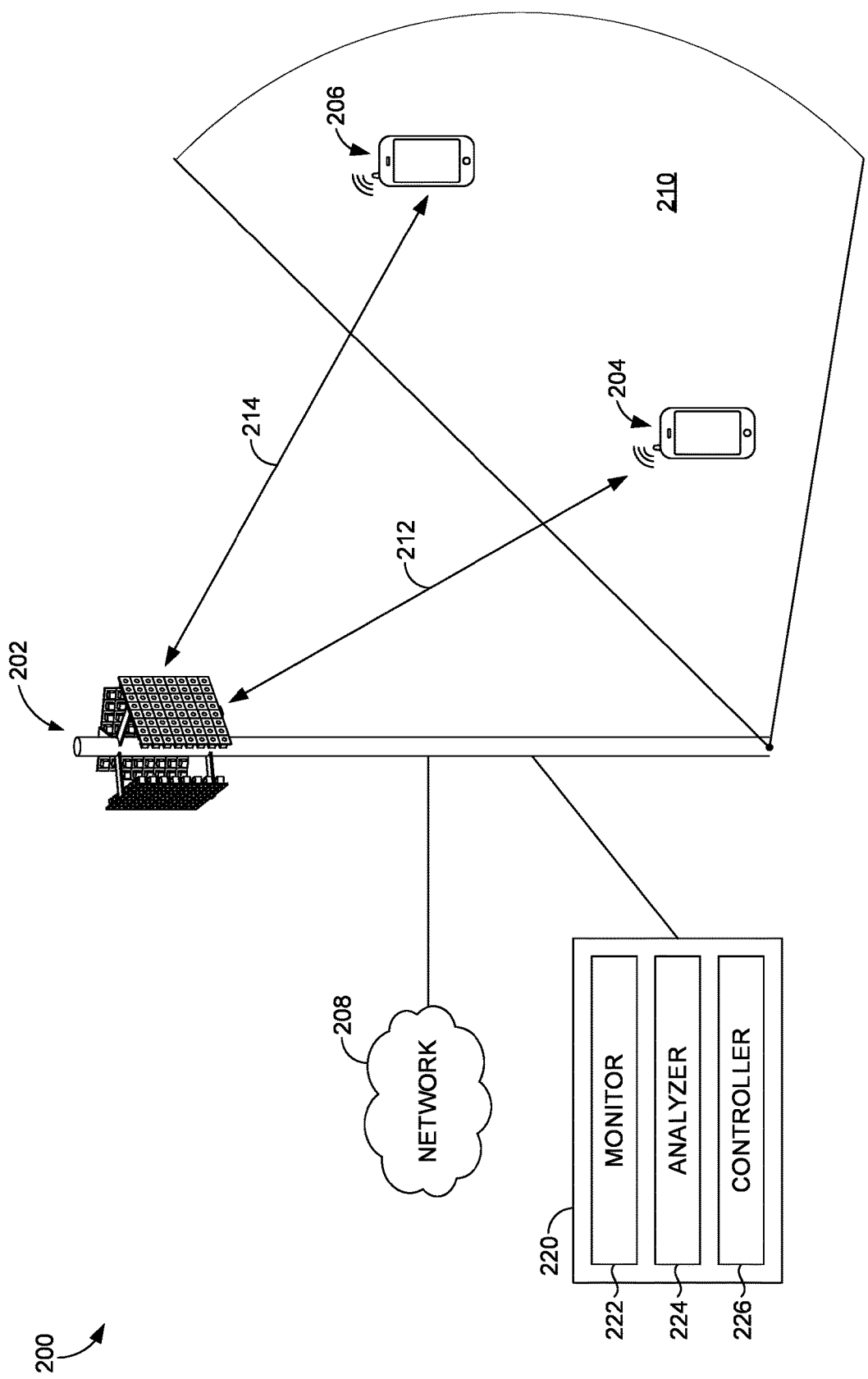
FIG. 2. illustrates a network environment in which implementations of the present disclosure may be employed.

Turning now to FIG. 2, an exemplary network environment is illustrated in which implementations of the present disclosure may be employed. Such a network environment is illustrated and designated generally as network environment 200. At a high level the network environment 200 comprises one or more UEs, one or more base stations, and one or more networks. Though each of a first UE 204 and a second UE 206 are illustrated as cellular phones, a UE suitable for implementations with the present disclosure may be any computing device having any one or more aspects described with respect to FIG. 1. Similarly, though a base station 202 is illustrated as a macro cell on a cell tower, any scale or form of access point acting as a transceiver station for wirelessly communicating with a UE, including small cells, pico cells, and the like, are suitable for use with the present disclosure.

The network environment 200 comprises one or more base station with which a UE may wirelessly communicate. The base station 202 comprises hardware and software components that allow it to wirelessly communicate with one or more UEs in one or more coverage areas. Each coverage area may be logically defined in space and frequency as one or more cells, which may or may not overlap. An example of such a cell is cell 210, in which the base station 202 is configured to wirelessly communicate with the first UE 204 using a first wireless connection 212 and the second UE 206 using a second wireless connection 214. Using any radio access technology selected by a mobile network operator (e.g., 4G, 5G, 6G, and the like), the base station may transmit and receive wireless signals using one or more antenna elements. In aspects for use with the present disclosure, the base station 202 may be configured to use each of a first set of antenna elements and a second set of antenna elements to carry out said wireless communication, wherein signals emitted from the first set of antenna elements have a first polarization and signals emitted from the second set of antenna elements have a second, different, polarization.

Each base station of the one or more base stations may be associated with one or more at least partially distinct networks, wherein each network is associated with one or more network identifiers. Each network may be a telecommunications network(s) (e.g., a packet data network or core network), data network, or portions thereof. A telecommunications network that at least partially comprises the network environment 200 may include additional devices or components (e.g., one or more base stations) not shown. Those devices or components may form network environments similar to what is shown in FIG. 2, and may also perform methods in accordance with the present disclosure. Components such as terminals, links, and nodes (as well as other components) may provide connectivity in various implementations.

In order to make determinations regarding the use of additionally polarized signals, the network environment 200 may comprise a polarization optimization engine 220. Though illustrated as a dedicated engine comprising three discrete modules, one skilled in the art will appreciate that different deployments of hardware and software may be utilized to effectuate the inventive concept of the present disclosure without departing therefrom. The polarization optimization engine 220 may be deployed at the base station 202, a network edge (not illustrated), or within the network 208. Accordingly, the polarization engine 220 may be said to comprise a monitor 222, an analyzer 224, and a controller 226.

The monitor 222 is generally configured to make measure or obtain data points about a connection between a UE and the base station 202 and the radio environment in the cell 210 that may be used in order to determine if, and to what extent, additionally polarized signals should be communicated to the UE. The monitor 222 is also configured to communicate any one or more measurements or determinations to the analyzer 224.

The monitor 222 is configured to monitor the connections between the base station 202 and UEs and UE-specific radio resource demand. In a first aspect, the base station 202 may determine that the second connection 214 with the second UE 206 is not optimized because one or more parameters of the signaling between the base station 202 and the second UE 206 are below a predetermined threshold; for example, because the UE 206 is relatively distant from the base station 202, it may observe a threshold high amount of interference, a threshold low signal strength, and/or a threshold low signal quality. In another aspect, the base station 202 may determine a connection between the base station 202 and the first UE is not optimized because the first UE 204 is engaged in particularly heavy data usage; that is the monitor 222 may determine that the first UE 204 is requesting greater than a predetermined threshold amount of downlink radio resources. In such an aspect, the monitor 222 may be further configured to determine the one or more parameters of the first connection 212 with the first UE 204. In yet other aspects, the monitor 222 may be configured to determine the number of data streams (i.e., channel matrix rank) between the cell 210 or the base station 202 is below a predetermined threshold (e.g., less than two data streams).

The monitor 222 is further configured to monitor one or more characteristics of the radio environment within the coverage area 210. In addition to the monitor 222 being used to monitor UE-specific usage and UE-specific wireless connections, the monitor 222 may monitor the overall radio conditions in the cell 210. The monitor 222 may determine a number of UEs connected to the base station 202 or the cell 210. The monitor may, alternatively or additionally, determine a radio resource or spectrum utilization (e.g., a percentage of physical resource blocks that are cumulatively allocated to each UE connected to the cell 210 or the base station 202). The monitor 222 may, alternatively or additionally, determine an interference level of the cell 210, wherein the interference level may be the worst interference measurement (e.g., SINR) of any UE connected to the cell 210 or base station 202, and/or wherein the interference level may be an average interference (e.g., SINR) of all UEs connected to the cell 210 or base station 202. The monitor may, alternatively or additionally, determine an average or worst latency with one or more UEs connected to the cell 210 or base station 202.

The analyzer 224 is generally configured to use one or more data points from the monitor 222 in order to determine if, and to what extent, additionally polarized signals should be communicated to the UE. In one aspect, additionally polarized signals may be communicated if the analyzer 224 determines that one or more UE-specific conditions have been met for the first UE 204 and each of a plurality of radio environment conditions have been met. For example, if the one or more UE-specific conditions comprise a UE observing a threshold high downlink signal strength, a threshold high signal quality, a threshold high SINR, and a data rank of less than two (i.e., less than two active data streams), and the plurality of radio environment conditions comprise a threshold high average SINR, a threshold low latency, a threshold low number of connected UEs, and a threshold low radio resource utilization, then the analyzer 224 may communicate to the controller 226 that a second set of downlink signals can be communicated to the first UE 204. In another aspect, additionally polarized signals may be communicated if the analyzer 224 determines that one or more UE-specific conditions have been met for the second UE 206 and at least one radio environment condition of a plurality of radio environment conditions have been met. With reference to the preceding example, the analyzer 224 may communicate to the controller 226 that a second set of downlink signals can be communicated if one or more of the average SINR, latency, connected UE, and utilization threshold are met. In yet another aspect, additionally polarized signals may be communicated if the analyzer 224 determines that each of a plurality of UE-specific conditions have been met for the first UE 204 and at least one of a plurality of radio environment conditions have been met. In another aspect, additionally polarized signals may be communicated if the analyzer 224 determines that one or more UE-specific conditions have been met for the second UE 206 and that a radio environment score is greater than a threshold value, wherein the radio environment score comprises a sum of values (weighted or unweighted) associated with one or more radio environment conditions. If the analyzer 224 determines that the UE-specific conditions for a particular UE or the radio environment conditions are not met, then the analyzer 224 will communicate an indication to the controller 226 that additionally polarized signals should not be communicated to the particular UE.

The controller 226 is generally configured to receive one or more indications from the analyzer 224, determine how additionally polarized signals should be communicated, and communicate instructions to the base station 202. Accordingly, the controller 226 may determine polarization and data stream configurations if an additionally polarized set of signals should be communicated. If the controller 226 receives an indication that additionally polarized signals should be communicated to the first UE 204, then the controller 226 may determine a polarization used by a first set of antennas of the base station 202 to communicate a first set of downlink signals to the first UE 204. The controller 226 may then select a second set of antennas of the base station 202 that can communicate a second set of signals to the first UE 204 using a second polarization, wherein the second polarization is different than the first polarization. For example, the controller 226 may determine that, prior to optimization, the base station was using the first set of antennas to communicate a vertically polarized set of first signals to the first UE 204; accordingly, the controller 226 may select the select second set of antennas on the basis that the second set of antennas can communicate the second set of signals using a non-vertical polarization (e.g., slant polarization, horizontal polarization, circular polarization, elliptical polarization, and the like).

Figure 3:
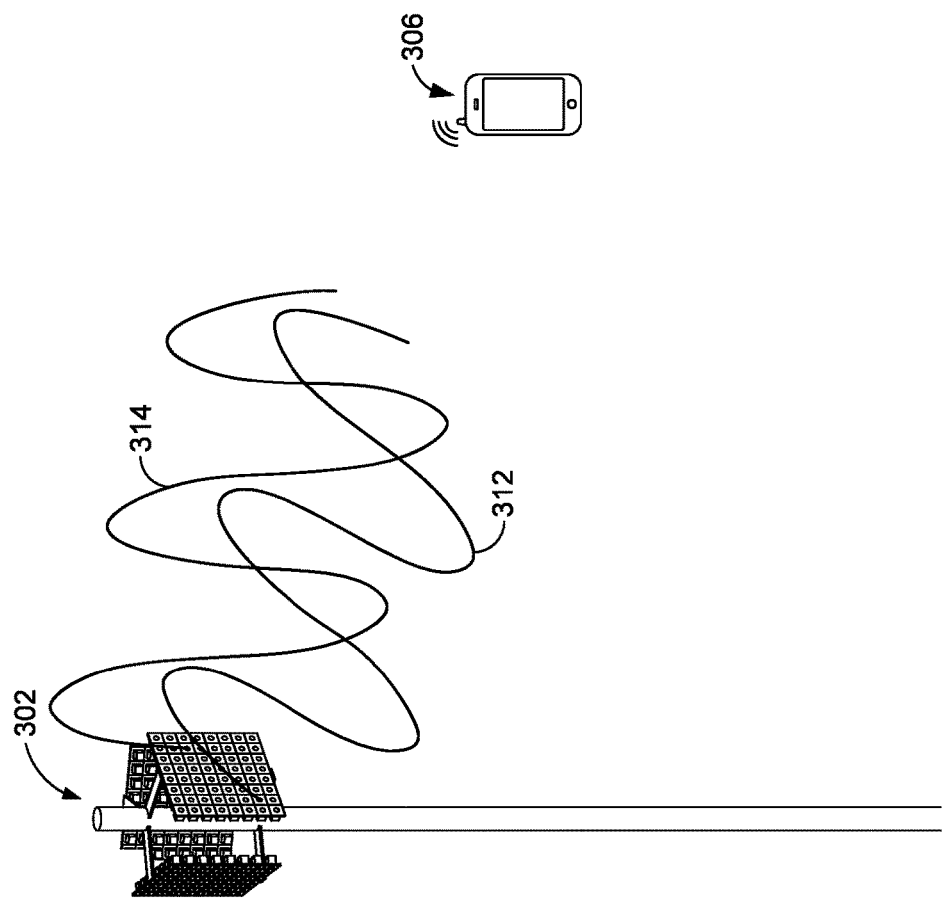
FIG. 3. Illustrates an environment with a plurality of waveforms in which implementations of the present disclosure may be employed.

Turning now to FIG. 3, a network environment 300 is provided that illustrates multiple, differently-polarized signals being communicated to a UE. The network environment comprises a base station 302 (such as the base station 202 of FIG. 2), and a UE 306 (such as the first UE 204 or the second UE 206 of FIG. 2). Based on the controller 226 of FIG. 2 determining that a first set of signals is transmitted from a first set of antenna elements of the base station 302 to the UE 306 using a vertically polarized signal 314, and that a second set of signals should be transmitted to the UE 306, then the controller 226 of FIG. 2 may instruct the base station 302 to transmit a second set of signals from a second set of antenna elements of the base station 302 to the UE 306 using a non-vertically polarized signal 312. Though illustrated as being slant polarized, the non-vertically polarized signal 312 is characterized by its difference from the vertically polarized signal 314 and, therefore, may be horizontally polarized, circularly polarized, elliptically polarized, or the like.

Returning to FIG. 2, the controller 226 is further configured to determine what type of data session should be created using the second set of signals discussed above, with respect to FIGS. 2-3. The controller 226 may instruct the base station to communicate the same data using both the first set of signals (having a first polarization) and the second set of signals (having a second polarization), or the controller 226 may instruct the base station to communicate different data streams using the first and second set of signals. If, for example, the controller 226 receives an indication that the first UE 204 has satisfied one or more UE specific parameters indicating that the first connection 212 first UE 204 and the base station 202 is better than a predetermined threshold and that the first UE 204 is only being served by a single data stream, then the controller 226 may instruct the base station 202 to utilize the second set of downlink signals (with the second polarization) to communicate a second data stream—increasing the overall throughput by way of spatial multiplexing. Conversely, if the controller 226 receives an indication that the second UE 206 has satisfied a different set of UE-specific parameters, wherein the second connection 214 is worse than a predetermined threshold, then the controller 226 could instruct the base station 202 to communicate the same data in both the first set of signals (having the first polarization) and the second set of signals (having the second polarization)—increasing the overall quality of the second connection 214 by way of spatial diversity.

In addition to making polarization decisions, the controller 226 may also be configured to monitor the effect of polarization optimization actions. For example, the controller 226, in concert with the monitor 222 and the analyzer 224, may, a predetermined amount of time after implementation of the polarization optimization action (e.g., transmitting the second set of signals from the second set of antenna elements, wherein the second set of signals has a second, different polarization than a first set of signals transmitted by a first set of antenna elements), re-evaluate the one or more of the UE-specific parameters and the radio environment parameters in order to determine if the transmission of the additional signals has undesirably degraded the radio environment of the cell 210 (e.g., by worsening SINR to a below threshold value). Finally, the controller 226 may be configured to only implement one or more polarization optimization actions based on a determination that the base station 202 is configured to transmit signals using a mmWave frequency between 30 GHz and 300 GHz or in frequency range 2 (FR2) in the range of 24 GHz and 53 GHz.

Figure 4:
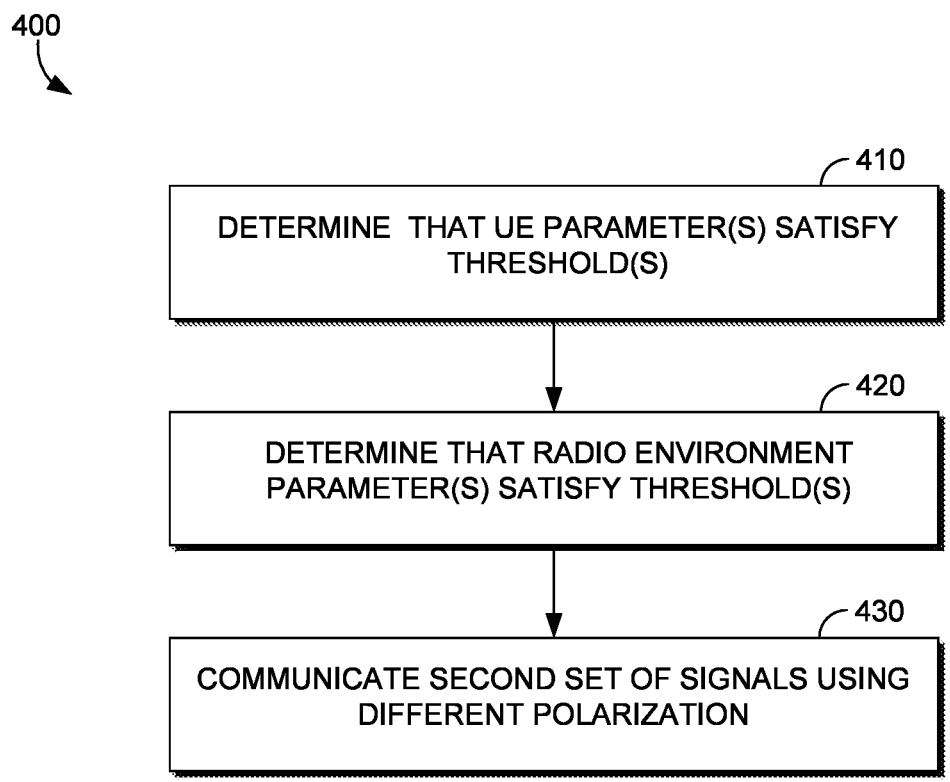
FIG. 4 depicts a flow diagram of a method in accordance with embodiments described herein.

Turning now to FIG. 4, a flow chart representing a method 400 is provided. Generally the method 400 may be used by a base station, such as the base station 202 of FIG. 2, to improve the quality of a connection with a user equipment (UE). At a first step 410, it is determined that one or more UE-specific parameters satisfy a UE-specific threshold, according to any one or more aspects discussed with respect to FIGS. 2-3. At a second step 420, it is determined that one or more radio environment parameters satisfy a radio environment threshold, according to any one or more aspects discussed with respect to FIGS. 2-3. At a third step 430, a second set of downlink signals are communicated to a UE based on the UE-specific and radio environment thresholds being satisfied, wherein the second set of signals are communicated to the UE in addition to a first set of downlink signals, the first set of downlink signals transmitted from a first set of antenna elements and having a first polarization and the second set of downlink signals being transmitted from a second set of antenna elements and having a second polarization, according to any one or more aspects discussed with respect to FIGS. 2-3.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for enhancing a wireless connection between a base station and a user equipment (UE), the system comprising:
    a plurality of antenna elements configured to transmit one or more downlink signals from the base station to the UE, the plurality of antenna elements comprising a first set of antenna elements and a second set of antenna elements; and
    one or more computer processing components configured to perform operations comprising:
    determining that one or more UE-specific parameters of a first connection between the base station and the UE satisfies one or more UE-specific thresholds, the first connection comprising a first set of signals transmitted from the first set of antenna elements and having a first polarization;
    determining that one or more radio environment parameters of a coverage area comprising the UE satisfies one or more radio environment thresholds; and
    based on said determinations, transmitting a second set of signals to the UE using the second set of antenna elements, wherein the second set of signals has a second polarization, the first polarization being different than the second polarization.

2. The system of claim 1, wherein each of the first set of signals and the second set of signals have a frequency greater than 24 GHz.

3. The system of claim 2, wherein the first polarization is vertical and the second polarization is selected from a group consisting of slant, horizontal, circular, and elliptical.

4. The system of claim 3, wherein the radio environment parameters comprise an interference level, a latency value, a number of connected UEs, and a utilization value.

5. The system of claim 4, wherein the one or more radio environment parameters comprises the interference level, the number of connected UEs, and the utilization value, and wherein satisfying the one or more radio environment thresholds comprises the interference level being an average interference level for all UEs in the coverage area and less than a first threshold, the number of connected UEs being less than a second threshold, and the utilization value being a physical resource block utilization value being less than a third threshold.

6. The system of claim 4, wherein the one or more UE-specific parameters are worse than a predetermined threshold, the one or more parameters comprising an interference value, a signal strength value, or a signal quality value.

7. The system of claim 6, wherein the one or more UE-specific parameters comprise an interference value, a signal strength value, and a signal quality value, and wherein the interference value is a signal to noise ratio (SINR) less than a first threshold, the signal strength value is a reference signal receive power (RSRP) less than a second threshold, and the signal quality is a reference signal receive quality (RSRQ) less than a third threshold.

8. The system of claim 6, wherein each of the first set of signals and the second set of signals communicate a same data stream to the UE.

9. The system of claim 4, wherein the one or more UE-specific parameters comprises a UE MIMO rank and wherein satisfying the one or more UE-specific thresholds comprises the UE MIMO rank being less than two.

10. The system of claim 9, wherein the one or more UE-specific parameters comprise a signal to interference noise ratio (SINR), a reference signal receive power (RSRP), or a reference signal receive quality (RSRQ), and wherein satisfying the one or more UE-specific thresholds comprises the one or more UE-specific parameters exceeding the one or more UE-specific thresholds.

11. The system of claim 9, wherein the one or more UE-specific parameters comprise the signal to interference noise ratio (SINR), the reference signal receive power (RSRP), and the reference signal receive quality (RSRQ), and wherein satisfying the one or more UE-specific thresholds comprises the SINR exceeding a first threshold, the RSRP exceeding a second threshold, and the RSRQ exceeding a third threshold.

12. The system of claim 10, wherein the first set of signals comprises a first data stream and the second set of signals comprises a second data stream, the first data stream being different than the second data stream.

13. A method for enhancing a wireless connection between a base station and a user equipment (UE), the method comprising:
    determining that one or more UE-specific parameters of a first connection between the base station and the UE satisfies one or more UE-specific thresholds, the first connection comprising a first set of signals transmitted from a first set of antenna elements and having a first polarization;
    determining that one or more radio environment parameters of a coverage area comprising the UE satisfies one or more radio environment thresholds; and
    based on said determinations, transmitting a second set of signals from the base station to the UE using a second set of antenna elements, wherein the second set of signals has a second polarization, the first polarization being different than the second polarization.

14. The method of claim 13, wherein each of the first set of signals and the second set of signals have a frequency greater than 24 GHz, and wherein the first polarization is vertical and the second polarization is selected from a group consisting of slant, horizontal, circular, and elliptical.

15. The method of claim 14, wherein each of the first set of signals and the second set of signals communicate a same data stream to the UE.

16. The method of claim 14, wherein the first set of signals comprises a first data stream and the second set of signals comprises a second data stream, the first data stream being different than the second data stream.

17. A non-transitory computer readable media having instructions stored thereon that, when executed by one or more computer processing components, cause the one or more computer processing components to perform a method for enhancing a wireless connection between a base station and a user equipment (UE), the method comprising:
    determining that one or more UE-specific parameters of a first connection between the base station and the UE satisfies one or more UE-specific thresholds, the first connection comprising a first set of signals transmitted from a first set of antenna elements and having a first polarization;
    determining that one or more radio environment parameters of a coverage area comprising the UE satisfies one or more radio environment thresholds; and
    based on said determinations, transmitting a second set of signals from the base station to the UE using a second set of antenna elements, wherein the second set of signals has a second polarization, the first polarization being different than the second polarization.

18. The non-transitory computer readable media of claim 17, wherein each of the first set of signals and the second set of signals have a frequency greater than 24 GHz, and wherein the first polarization is vertical and the second polarization is selected from a group consisting of slant, horizontal, circular, and elliptical.

19. The non-transitory computer readable media of claim 18, wherein each of the first set of signals and the second set of signals communicate a same data stream to the UE.

20. The non-transitory computer readable media of claim 19, wherein the first set of signals comprises a first data stream and the second set of signals comprises a second data stream, the first data stream being different than the second data stream.

* * * * *